US012811249B2

(12) United States Patent
Kitta et al.

(10) Patent No.: US 12,811,249 B2
(45) **Date of Patent: *Nov. 24, 2026**

(54) NON-AQUEOUS ELECTROLYTE SECONDARY BATTERY

(71) Applicant: Panasonic Energy Co., Ltd, Moriguchi (JP)

(72) Inventors: Kazuki Kitta, Tokushima (JP); Shinji Kasamatsu, Osaka (JP); Nobuhiro Sakitani, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 583 days.

This patent is subject to a terminal disclaimer.

(21) Appl. No.: 18/275,523

(22) PCT Filed: Feb. 3, 2022

(86) PCT No.: PCT/JP2022/004223
§ 371 (c)(1),
(2) Date: Aug. 2, 2023

(87) PCT Pub. No.: WO2022/176629
PCT Pub. Date: Aug. 25, 2022

(65) Prior Publication Data
US 2023/0420803 A1 Dec. 28, 2023

(30) Foreign Application Priority Data
Feb. 19, 2021 (JP) ................................ 2021-025543

(51) Int. Cl.
*H01M 50/457* (2021.01)
*H01M 50/417* (2021.01)
(Continued)

(52) U.S. Cl.
CPC ....... *H01M 50/457* (2021.01); *H01M 50/417* (2021.01); *H01M 50/42* (2021.01);
(Continued)

(58) Field of Classification Search
CPC .. H01M 50/42; H01M 50/434; H01M 50/451; H01M 50/446; H01M 50/443;
(Continued)

(56) References Cited

U.S. PATENT DOCUMENTS

2013/0059192 A1* 3/2013 Kajita ................. H01M 50/451 429/143
2018/0309108 A1* 10/2018 Shin ...................... H01M 50/42
(Continued)

FOREIGN PATENT DOCUMENTS

CN 111092192 A 5/2020
JP 2013-137984 A 7/2013
(Continued)

OTHER PUBLICATIONS

The decision of JPO to grant a Patent for Application JP 2023500706 (Year: 2026).*
(Continued)

*Primary Examiner* — Alexander Usyatinsky
(74) *Attorney, Agent, or Firm* — WHDA, LLP

(57) ABSTRACT

An embodiment of the present invention provides a non-aqueous electrolyte secondary battery wherein a separator has a porous base material and a heat-resistant layer including a filler and a binding agent. The heat-resistant layer includes a first heat-resistant layer formed on a first surface of the base material facing a positive electrode and a second heat-resistant layer formed on a second surface of the base material facing a negative electrode. The first heat-resistant material is formed as a sheet on the first surface of the base material and the second heat-resistant layer is formed as dots
(Continued)

on the second surface of the base material. The average value of the intervals between the plurality of dots constituting the second heat-resistant layer is 30-100 μm.

4 Claims, 2 Drawing Sheets

(51) Int. Cl.

| | |
|---|---|
| ***H01M 50/42*** | (2021.01) |
| ***H01M 50/434*** | (2021.01) |
| ***H01M 50/443*** | (2021.01) |
| ***H01M 50/446*** | (2021.01) |
| ***H01M 50/451*** | (2021.01) |
| ***H01M 50/463*** | (2021.01) |
| ***H01M 50/489*** | (2021.01) |

(52) U.S. Cl.
CPC ....... *H01M 50/434* (2021.01); *H01M 50/443* (2021.01); *H01M 50/446* (2021.01); *H01M 50/451* (2021.01); *H01M 50/463* (2021.01); *H01M 50/489* (2021.01)

(58) Field of Classification Search
CPC ............. H01M 50/463; H01M 50/417; H01M 50/489; H01M 50/457
See application file for complete search history.

(56) References Cited

U.S. PATENT DOCUMENTS

| | | | | |
|---|---|---|---|---|
| 2020/0287192 | A1* | 9/2020 | Shin .................... | H01M 50/446 |
| 2021/0249735 | A1* | 8/2021 | Saeki .................. | H01M 50/461 |

FOREIGN PATENT DOCUMENTS

| | | | |
|---|---|---|---|
| JP | 2015-018600 | A | 1/2015 |
| JP | 2019-503577 | A | 2/2019 |
| WO | 2020/004205 | A1 | 1/2020 |

OTHER PUBLICATIONS

International Search Report dated Mar. 22, 2022, issued in counterpart International Application No. PCT/JP2022/004223, with English translation. (5 pages).
Written Opinion dated Mar. 22, 2022, issued in counterpart International Application No. PCT/JP2022/004223. (3 pages).
Office Action dated Jul. 16, 2026, issued in counterpart CN Application No. 202280013805.2, with English translation.

* cited by examiner

NON-AQUEOUS ELECTROLYTE SECONDARY BATTERY

CROSS-REFERENCE TO RELATED APPLICATIONS

This application is a National Phase Application filed under 35 U.S.C. § 371 of International Application No. PCT/JP2022/004223 filed on Feb. 3, 2022, which claims the benefit of priorities under 35 U.S.C. § 119 (a) of Japanese Patent Application No. 2021-025543 filed in Japan on Feb. 19, 2021, the contents of which are incorporated herein by reference.

TECHNICAL FIELD

The present disclosure generally relates to a non-aqueous electrolyte secondary battery.

BACKGROUND ART

In recent years, non-aqueous electrolyte secondary batteries comprising an electrode assembly in which a positive electrode and a negative electrode are disposed facing each other with a separator interposed therebetween are widely used as secondary batteries with high output and high energy density. For example, Patent Literature 1 discloses a non-aqueous electrolyte secondary battery comprising an electrode assembly in which a positive electrode and a negative electrode are disposed facing each other with a separator interposed therebetween, wherein the separator has a porous substrate and a heat-resistant layer formed on at least one surface of the substrate, and a porosity of the heat-resistant layer is greater than or equal to 55%.

CITATION LIST

Patent Literature

PATENT LITERATURE 1: Japanese Unexamined Patent Application Publication No. 2015-18600

SUMMARY

Technical Problem

The heat-resistant layer in the separator is commonly formed on a surface of the substrate facing the positive electrode. According to investigation by the present inventors, it has been found that forming the heat-resistant layer on only the surface facing the positive electrode causes the heat-resistant layer to be a liquid-storing layer, and an electrolyte liquid is likely to be unevenly present on the positive electrode side in the separator. In this case, the electrolyte liquid is in short supply on the negative electrode side, and a capacity may be considerably decreased by repeated charge and discharge.

It is an advantage of the present disclosure to improve charge-discharge cycle characteristics in the non-aqueous electrolyte secondary battery comprising the separator having the heat-resistant layer.

Solution to Problem

A non-aqueous electrolyte secondary battery according to the present disclosure comprises: a positive electrode; a negative electrode; and a separator, wherein the separator has: a porous substrate; and heat-resistant layers each including a filler and a binder, the heat-resistant layers include: a first heat-resistant layer formed on a first surface of the substrate facing the positive electrode; and a second heat-resistant layer formed on a second surface of the substrate facing the negative electrode, the first heat-resistant layer is formed as a sheet on the first surface of the substrate, and the second heat-resistant layer is formed as dots on the second surface of the substrate, and an average value of pitch of a plurality of the dots is greater than or equal to 30 μm and less than or equal to 100 μm.

Advantageous Effect of Invention

The non-aqueous electrolyte secondary battery according to the present disclosure has excellent charge-discharge cycle characteristics.

DESCRIPTION OF EMBODIMENTS

Figure 1:
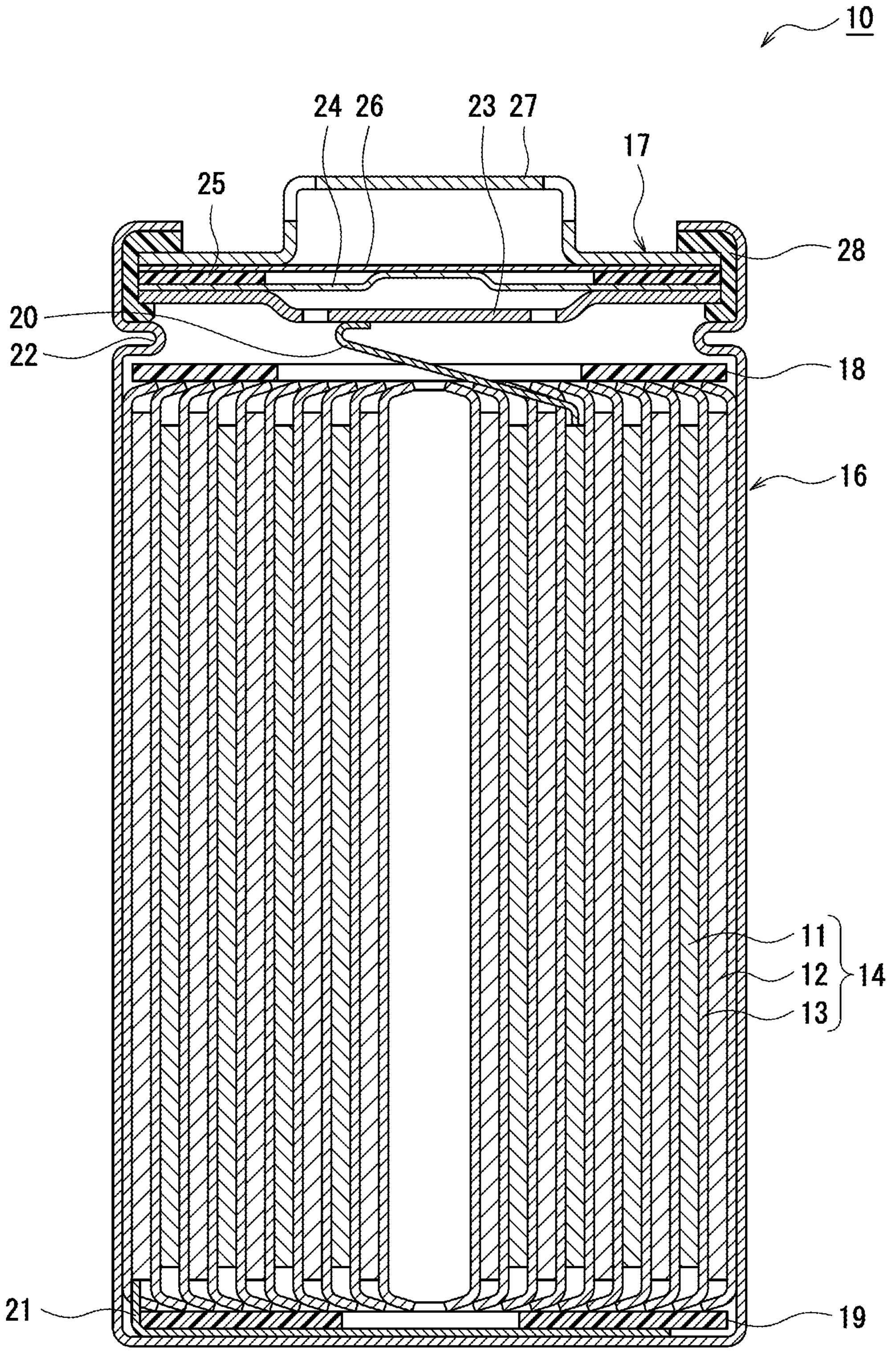
FIG. 1 is a schematic sectional view of a non-aqueous electrolyte secondary battery of an example of an embodiment.

As noted above, investigation by the present inventors has consequently revealed a problem of considerably decreased capacity brought about by repeated charge and discharge in a non-aqueous electrolyte secondary battery using a separator having a heat-resistant layer only on a surface of a porous substrate facing a positive electrode. The heat-resistant layer is commonly formed on the surface of the substrate facing the positive electrode in order to inhibit deterioration of the substrate due to a high potential of the positive electrode; however, an electrolyte liquid is unevenly present on the positive electrode side in this case, and the electrolyte liquid is likely to be in short supply on the negative electrode side. The heat-resistant layer including much filler is considered to form a liquid-storing layer storing the electrolyte liquid. Forming a similar heat-resistant layer also on a surface of the substrate facing the negative electrode is conceivable; however, it has been found that forming the similar heat-resistant layers are formed on both the surfaces of the substrate does not lead to the improvement of cycle characteristics, or rather deteriorates the cycle characteristics (see Comparative Example 2, described later).

The present inventors have made intensive investigation to improve the charge-discharge cycle characteristics of the non-aqueous electrolyte secondary battery comprising the separator having the heat-resistant layer, and consequently have found that the cycle characteristics are specifically improved by forming a heat-resistant layer as a plurality of dots on a surface of the substrate facing the negative electrode and disposing these dots with a predetermined pitch. It is considered that forming the heat-resistant layer as dots forms a large space to store the electrolyte liquid between the negative electrode and the separator to solve the shortage of the electrolyte liquid on the negative electrode side, leading to improvement of the cycle characteristics.

Hereinafter, an example of an embodiment of the non-aqueous electrolyte secondary battery according to the present disclosure will be described in detail with reference to drawings. Note that, the present disclosure includes selectively combining a plurality of embodiments and modified examples described below.

Hereinafter, a cylindrical battery in which a wound electrode assembly 14 is housed in a bottomed cylindrical exterior housing can 16 will be exemplified, but the exterior of the battery is not limited to a cylindrical exterior housing can, and may be, for example, a rectangular exterior housing can (rectangular battery), a coin-shaped exterior housing can (coin-shaped battery), or an exterior composed of laminated sheets including a metal layer and a resin layer (laminated battery). The electrode assembly may be a stacked electrode assembly in which a plurality of positive electrodes and a plurality of negative electrodes are alternately stacked with a separator interposed therebetween.

FIG. 1 is a view schematically illustrating a cross section of a non-aqueous electrolyte secondary battery 10 of an example of an embodiment. As illustrated in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening on one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted derivative in which hydrogen of these solvents is at least partially replaced with a halogen element such as fluorine.

Examples of the non-aqueous solvent include ethylene carbonate (EC), ethyl methyl carbonate (EMC), dimethyl carbonate (DMC), and a mixed solvent thereof. For the electrolyte salt, a lithium salt such as $LiPF_6$ is used, for example.

The positive electrode 11, the negative electrode 12, and the separator 13, which constitute the electrode assembly 14, are all a band-shaped elongated body, and spirally wound to be alternately stacked in a radial direction of the electrode assembly 14. To prevent precipitation of lithium, the negative electrode 12 is formed to be one size larger than the positive electrode 11. That is, the negative electrode 12 is foisted to be longer than the positive electrode 11 in a longitudinal direction and a width direction (short direction). Two separators 13 are formed to be one size larger than at least the positive electrode 11, and disposed to sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole of the insulating plate 18 toward the sealing assembly 17 side, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23 becomes a positive electrode terminal. The negative electrode lead 21 is connected to a bottom inner surface of the exterior housing can 16 by welding or the like, and the exterior housing can 16 becomes a negative electrode terminal.

The exterior housing can 16 is a bottomed cylindrical metallic container having an opening on one side in an axial direction, as noted above. A gasket 28 is provided between the exterior housing can 16 and the sealing assembly 17, thereby sealability inside the battery and insulation between the exterior housing can 16 and the sealing assembly 17 are ensured. On the exterior housing can 16, a grooved portion 22 in which a part of a side wall thereof projects inward to support the sealing assembly 17 is formed. The grooved portion 22 is preferably formed in a circular shape along a circumferential direction of the exterior housing can 16, and supports the sealing assembly 17 with the upper face thereof. The sealing assembly 17 is fixed on the upper part of the exterior housing can 16 with the grooved portion 22 and with an end part of the opening of the exterior housing can 16 caulked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected to each other. The lower vent member 24 and the upper vent member 26 are connected at each of central parts thereof, and the insulating member 25 is interposed between each of the circumferential parts. If the internal pressure increases due to battery abnormality, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through an opening of the cap 27.

Hereinafter, the positive electrode 11, the negative electrode 12, and the separator 13, which constitute the non-aqueous electrolyte secondary battery 10, particularly the separator 13, will be described in detail.

[Positive Electrode]

The positive electrode 11 has a positive electrode core and a positive electrode mixture layer provided on a surface of the positive electrode core. For the positive electrode core, a foil of a metal stable within a potential range of the positive electrode 11, such as aluminum and an aluminum alloy, a film in which such a metal is disposed on a surface layer thereof, and the like may be used. The positive electrode mixture layer includes a positive electrode active material, a conductive agent, and a binder, and is preferably provided on both surfaces of the positive electrode core except for a core exposed portion, a part to which the positive electrode lead is to be connected. A thickness of the positive electrode mixture layer is, for example, greater than or equal to 50 μm and less than or equal to 150 μm on one side of the positive electrode core. The positive electrode 11 may be produced by applying a positive electrode mixture slurry including the positive electrode active material, the conductive agent, the binder, and the like on the surface of the positive electrode core, and drying and subsequently compressing the coating to Ruin the positive electrode mixture layers on both the surfaces of the positive electrode core.

The positive electrode active material is composed of a lithium-transition metal composite oxide as a main component. Examples of an element contained in the lithium-transition metal composite oxide and excluding Li include Ni, Co, Mn, Al, B, Mg, Ti, V, Cr, Fe, Cu, Zn, Ga, Sr, Zr, Nb, In, Sn, Ta, W, Si, and P. An example of the preferable lithium-transition metal composite oxide is a composite oxide containing at least one of Ni, Co, and Mn. Specific examples thereof include a lithium-transition metal composite oxide containing Ni, Co, and Mn, and a lithium-transition metal composite oxide containing Ni, Co, and Al.

Examples of the conductive agent included in the positive electrode mixture layer include carbon materials such as carbon black, acetylene black, Ketjenblack, and graphite. Examples of the binder included in the positive electrode mixture layer include a fluororesin such as polytetrafluoroethylene (PTFE) and polyvinylidene fluoride (PVDF), polyacrylonitrile (PAN), a polyimide, an acrylic resin, and a polyolefin. With these resins, a cellulose derivative such as carboxymethylcellulose (CMC) or a salt thereof, polyethylene oxide (PEO), and the like may be used in combination.

[Negative Electrode]

The negative electrode 12 has a negative electrode core and a negative electrode mixture layer provided on a surface of the negative electrode core. For the negative electrode core, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on both surfaces of the negative electrode core except for a portion to which the negative electrode lead 21 is to be connected, for example. A thickness of the negative electrode mixture layer is, for example, greater than or equal to 50 μm and less than or equal to 150 μm on one side of the negative electrode core. The negative electrode 12 may be produced by, for example, applying a negative electrode mixture slurry including the negative electrode active material, the binder, and the like on the surface of the negative electrode core, and drying and subsequently compressing the coating to form the negative electrode mixture layers on both the surfaces of the negative electrode core.

The negative electrode mixture layer includes, for example, a carbon-based active material that reversibly occludes and releases lithium ions, as the negative electrode active material. A preferable carbon-based active material is a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, an active material including at least one of an element that forms an alloy with Li, such as Si and Sn, and a material containing such an element may also be used, and the carbon-based active material and the above active material may be used in combination. As the negative electrode active material, the carbon-based active material and a Si-containing material (Si-based active material) are used in combination, for example. An example of the preferable Si-based active material includes a material in which Si fine particles are dispersed in a silicon oxide phase or a silicate phase such as lithium silicate.

For the binder included in the negative electrode mixture layer, a fluororesin, PAN, a polyimide, an acrylic resin, a polyolefin, and the like may be used as in the case of the positive electrode 11, and styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR, and CMC or a salt thereof, or PAA or a salt thereof are preferably used in combination.

[Separator]

Figure 2:
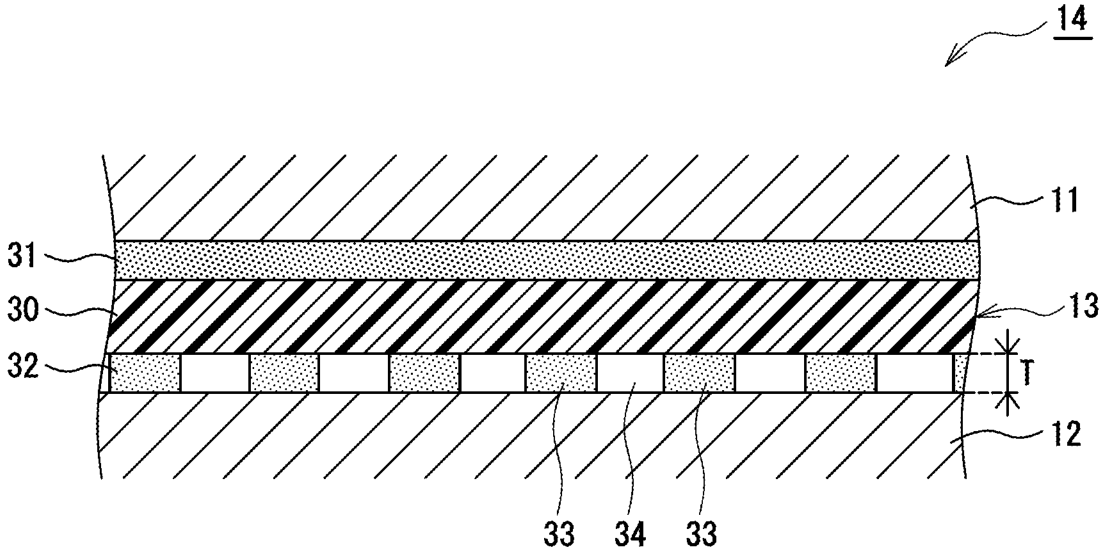
FIG. 2 is a view schematically illustrating a part of a cross section of an electrode assembly of an example of an embodiment.
Figure 3:
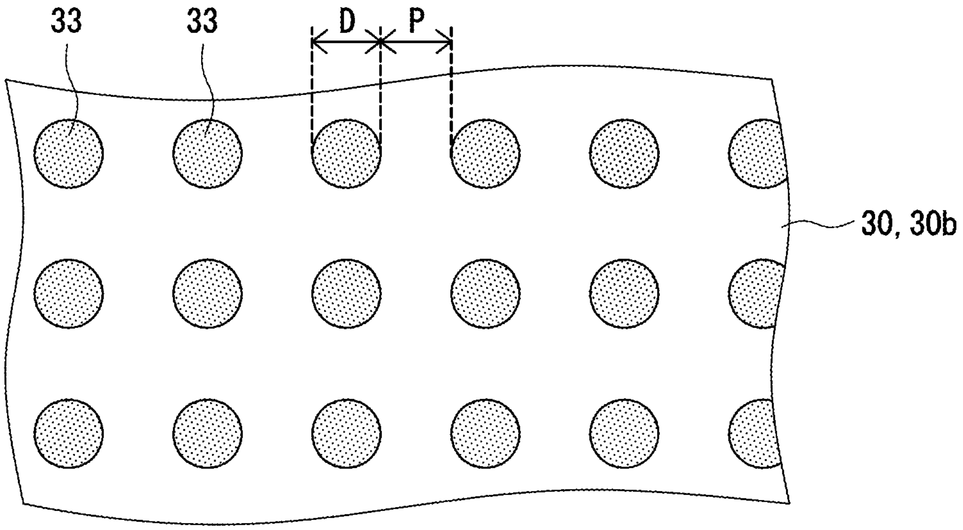
FIG. 3 is a view schematically illustrating a part of a surface of a separator of an example of an embodiment.

FIG. 2 is a schematic cross-sectional view of the electrode assembly 14, which illustrates the separator 13 and a proximity thereof. FIG. 3 is a view schematically illustrating a part of a surface of the separator 13 facing the negative electrode 12 side. As illustrated in FIG. 2 and FIG. 3, the separator 13 has: a porous substrate 30; and heat-resistant layers each including a filler and a binder, and the heat-resistant layers include: a first heat-resistant layer 31 formed on a first surface of the substrate 30 facing the positive electrode 11; and a second heat-resistant layer 32 formed on a second surface of the substrate 30 facing the negative electrode 12. The separator 13 is preferably formed to be larger than the positive electrode 11 and the negative electrode 12 in both of width and length in order to prevent electric contact between the positive electrode 11 and the negative electrode 12. Therefore, the separator 13 has a form of extension from an end of the electrodes of the electrode assembly 14.

The substrate 30 is a porous sheet having an ion permeation property and an insulation property, and is composed of, for example, a fine porous thin film, a woven fabric, or a nonwoven fabric. The material of the substrate 30 is not particularly limited, and specific examples thereof include a polyolefin such as polyethylene, polypropylene, and a copolymer of polyethylene and an α-olefin, an acrylic resin, polystyrene, a polyester, cellulose, a polyimide, polyphenylene sulfide, polyether ether ketone, and a fluororesin. The substrate 30 may have a single layer structure, or may have a stacked structure. A thickness of the substrate 30 is, for example, greater than or equal to 3 μm and less than or equal to 20 μm, and more preferably greater than or equal to 10 μm and less than or equal to 15 μm. An example of a porosity of the substrate 30 is greater than or equal to 30% and less than or equal to 70%.

The substrate 30 is composed of, for example, a polyolefin as a main component. The substrate 30 may be composed substantially of only a polyolefin. Using the substrate 30 made of a polyolefin yields good shutdown performance. Although the substrate 30 made of a polyolefin is easily oxidative-deteriorated due to the high potential of the positive electrode 11, the first heat-resistant layer 31 formed on the first surface of the substrate 30 effectively inhibits the oxidative deterioration of the substrate 30. Furthermore, the heat-resistant layer improves heat resistance of the separator 13 without impairing the shutdown performance of the substrate 30.

The heat-resistant layers (the first heat-resistant layer 31 and the second heat-resistant layer 32) are porous layers containing a filler as a main component. When the temperature rises due to abnormality of the battery, the heat-resistant layers relax an increased internal stress of the separator 13 to inhibit excessive thermal contraction of the separator 13. A content of the filler is preferably greater than or equal to 85 mass % and less than or equal to 99 mass %, and more preferably greater than or equal to 90 mass % and less than or equal to 98 mass %, relative to a total mass of the heat-resistant layer. The first heat-resistant layer 31 and the second heat-resistant layer 32 may be composed of the same materials, or may be composed of different materials.

The filler constituting the heat-resistant layer is of particles having a melting point or thermally softening point of greater than or equal to 150° C., preferably greater than or equal to 200° C., or may be of particles exhibiting no melting point nor thermally softening point. The filler may be of resin particles having high heat resistance, and is preferably inorganic particles. An example of the filler includes metal oxide particles, metal nitride particles, metal fluoride particles, and metal carbide particles. The filler may be used singly, or may be used in combination of two or more kinds thereof.

Examples of the metal oxide particles include aluminum oxide, titanium oxide, magnesium oxide, zirconium oxide, nickel oxide, silicon oxide, and manganese oxide. Examples of the metal nitride particles include titanium nitride, boron nitride, aluminum nitride, magnesium nitride, and silicon nitride. Examples of the metal fluoride particles include aluminum fluoride, lithium fluoride, sodium fluoride, magnesium fluoride, calcium fluoride, and barium fluoride. Examples of the metal carbide particles include silicon carbide, boron carbide, titanium carbide, and tungsten carbide.

The filler may be a porous aluminosilicate salt such as zeolite ($M_{2/n}O \cdot Al_2O_3 \cdot xSiO_2 \cdot yH_2O$, M represents a metal element, $x \geq 2$, and $y \geq 0$), a layered silicate salt such as talc ($Mg_3Si_4O_{10}(OH)_2$), barium titanate ($BaTiO_3$), strontium titanate ($SrTiO_3$), barium sulfate ($BaSO_4$), and the like. An average particle diameter of the filler is not particularly limited, and is preferably greater than or equal to 0.1 μm and less than or equal to 5 μm, and more preferably greater than or equal to 0.2 μm and less than or equal to 1 μm. A BET specific surface area of the filler is not particularly limited, and is preferably greater than or equal to 1 $m^2/g$ and less than or equal to 20 $m^2/g$, and more preferably greater than or equal to 3 $m^2/g$ and less than or equal to 15 $m^2/g$.

The binder constituting the heat-resistant layer has a function of adhering the fillers each other, or the filler and the substrate 30. An example of the binder includes fluororesins such as polyvinylidene fluoride (PVDF) and polytetrafluoroethylene (PTFE), a polyimide, an acrylic resin, an aramid resin, a polyolefin, styrene-butadiene rubber (SBR), nitrile-butadiene rubber (NBR), carboxymethylcellulose (CMC) or a salt thereof, a polyacrylic acid (PAA) or a salt thereof, and polyvinyl alcohol (PVA). These may be used singly, or may be used in combination of two or more kinds thereof. A content of the binder is preferably greater than or equal to 0.5 mass % and less than or equal to 10 mass %, and more preferably greater than or equal to 1 mass % and less than or equal to 5 mass %, relative to the total mass of the heat-resistant layer.

As noted above, the separator 13 has the first heat-resistant layer 31 and the second heat-resistant layer 32, which are respectively formed on both the surfaces of the substrate 30. The first heat-resistant layer 31 is formed as a sheet on the first surface of the substrate 30 facing the positive electrode 11 side. In contrast, the second heat-resistant layer 32 is formed as dots on the second surface of the substrate 30 facing the negative electrode 12 side. That is, the second heat-resistant layer 32 is composed of a plurality of dots 33. Forming the second heat-resistant layer 32 as dots forms a large space 34 to store the electrolyte liquid between the negative electrode 12 and the separator 13. This space is considered to solve the shortage of the electrolyte liquid on the negative electrode 12 side, and the cycle characteristics of the battery are remarkably improved.

The first heat-resistant layer 31 may be formed on a part of the first surface, for example, formed only in a region facing the positive electrode mixture layer in the first surface of the substrate 30, or the like; however, the first heat-resistant layer 31 is preferably formed in the entire region of the first surface including the region facing the positive electrode core in view of inhibition of deterioration of the substrate 30, inhibition of short circuit, improvement of productivity, and the like. The first heat-resistant layer 31 is interposed between the first surface of the substrate 30 and the positive electrode mixture layer, and abuts against the surface of the positive electrode mixture layer. The first heat-resistant layer 31, which is a porous layer having pores, continues in a mesh shape in the entire region on the first surface, and formed as a sheet pattern, which significantly differs from the second heat-resistant layer 32 in which the plurality of the dots 33 are scatteringly present. A thickness of the first heat-resistant layer 31 is not particularly limited, and the average thickness is preferably greater than or equal to 1 μm and less than or equal to 10 μm, and more preferably greater than or equal to 3 μm and less than or equal to 7 μm.

The second heat-resistant layer 32 is formed on the second surface of the substrate 30 in a pattern in which the plurality of the dots 33 are scatteringly present. The second heat-resistant layer 32 is interposed between the second surface of the substrate 30 and the negative electrode mixture layer, and abuts against the surface of the negative electrode mixture layer. The plurality of the dots 33 constituting the second heat-resistant layer 32 are disposed each other with a pitch, and the space 34 is present between each of the dots 33. An average value of the pitch P between the plurality of the dots 33 is greater than or equal to 30 μm and less than or equal to 100 μm. The space 34 has, for example, a volume larger than a volume of the dots 33 between the negative electrode 12 and the separator 13, and significantly contributes to solve the shortage of the electrolyte liquid on the negative electrode 12 side.

When the average value of the pitch P of the plurality of the dots 33 is greater than or equal to 30 μm and less than or equal to 100 μm, the sufficient space 34 is formed between the negative electrode 12 and the separator 13, which improves the cycle characteristics of the battery. Meanwhile, if the average value of the pitch P is less than 30 μm, the sufficient space 34 is not formed and the shortage of the electrolyte liquid on the negative electrode 12 side is not solved, resulting in failure to obtain the expected effect of improving the cycle characteristics. If the average value of the pitch P is more than 100 μm, the space 34 is considered to be pressed by a pressure applied from both the sides of the separator 13 to decrease the volume. Also, in this case, the shortage of the electrolyte liquid on the negative electrode 12 side is not solved.

The pitch P of the dots 33 means the shortest distance between the nearest dots 33 in each of the dots 33. When the plurality of the dots 33 are regularly formed, there are typically a plurality of the nearest dots 33. The dots 33 are preferably formed on the entire second surface, without being unevenly distributed on a part of the second surface of the substrate 30.

An average value of thicknesses T of the plurality of the dots 33 is, for example, greater than or equal to 11.1M and less than or equal to 20 μm, preferably greater than or equal to 3 μm and less than or equal to 10 μm, and more preferably greater than or equal to 3 μm and less than or equal to 7 μm. The thickness T of the dot 33 means a length along a thickness direction of the separator 13 from the second surface of the substrate 30 to the uppermost surface of the dot 33. The average thickness of the plurality of the dots 33 is same as an average thickness of the second heat-resistant layer 32. When the average value of the thicknesses T of the dots 33 is within the above range, the effect of improving the cycle characteristics becomes more remarkable. The average thickness of the dots 33 (the second heat-resistant layer 32) may be smaller than or larger than an average thickness of the first heat-resistant layer 31, and is preferably approximately the same.

An average value of diameters D (average diameter) of circumscribed circles of the plurality of the dots 33 is, for example, greater than or equal to 10 μm and less than or equal to 100 μm, preferably greater than or equal to 30 μm and less than or equal to 100 μm, and more preferably greater than or equal to 30 μm and less than or equal to 70 μm. Here, the circumscribed circle of the dot 33 means a circumscribed circle of the dot 33 in the second heat-resistant layer 32 (the second surface of the substrate 30) in plan view. When the dot 33 has a perfect-circle shape in plan view, the diameter of the dot 33 and the diameter D of the circumscribed circle are identical. When the average diameter of the dots 33 is within the above range, the effect of improving the cycle characteristics becomes more remarkable. The average diameter of the circumscribed circles of the dots 33 may be smaller than or larger than the average value of the pitch P of the dots 33, and is preferably approximately the same.

A shape of the plurality of the dots 33 is not particularly limited, and may be a cylindrical, prismatic, or hemispherical shape. In the present embodiment, each dot 33 is cylindrically formed. Although the second heat-resistant layer 32 may include dots 33 having different shapes and sizes, the shape and size (thickness T and diameter D) of each dot 33 are preferably similar. Each dot 33 is preferably disposed with a uniform pitch P. The plurality of the dots 33 constituting the second heat-resistant layer 32 have, for example, substantially same shape, thickness T, and diameter D, and are formed with a same pitch P between adjacent dots 33.

In the example illustrated in FIG. 3, the plurality of the dots 33 are disposed in column in the longitudinal direction and width direction of the substrate 30, and columns of the dots 33 are formed as a lattice. Although the plurality of the dots 33 may be irregularly formed as long as they satisfy the requirement of the average value of the pitch P of greater than or equal to 30 μm and less than or equal to 100 μm, the plurality of the dots 33 are preferably formed in a regular pattern in view of improvement of uniformity of the battery reaction, and the like. In the example illustrated in FIG. 3, for each dot 33, pitch P between dot 33 and adjacent four dots 33 in the longitudinal direction and the width direction of the substrate 30 are the same length. The regularly formed pattern of the dots 33 is not limited to the pattern illustrated in FIG. 3. For example, the dots 33 may be disposed in zigzag.

The pitch P, thickness T, and diameter D of the plurality of the dots 33 are measured by observing the separator 13 using a laser microscope (VK-9700, manufactured by KEYENCE CORPORATION). The average values of the pitch P, thicknesses T, and diameters D are calculated by selecting any region in the second surface of the substrate 30 including at least 100 dots 33, and averaging the measured values of the pitch P, thickness T, and diameter D of the 100 dots 33.

The first heat-resistant layer 31 and the second heat-resistant layer 32 may be formed by, for example, applying a dispersion liquid including the filler and the binder on the surfaces of the substrate 30, and then drying the coating. The dispersion liquid may be applied by a micro-gravure coating method. The shape, thickness T, diameter D, and pitch P of the dots 33 constituting the second heat-resistant layer 32 may be controlled by regulating a shape, depth, diameter, and pitch of cells, which is recesses of the gravure plate.

EXAMPLES

Hereinafter, the present disclosure will be further described with Examples, but the present disclosure is not limited to these Examples.

Example 1

[Production of Positive Electrode]

A positive electrode active material represented by $LiNi_{0.8}Co_{0.15}Al_{0.05}O_2$, acetylene black (AB), and polyvinylidene fluoride (PVDF) were mixed in N-methyl-2-pyrrolidone (NMP) at a solid content mass ratio of 98:1:1 by using a mixer to prepare a positive electrode mixture slurry. This positive electrode mixture slurry was applied on both surfaces of a positive electrode core made of aluminum foil, and the coating was dried and then compressed by using a roller. The positive electrode core was cut in a strip shape with a predetermined width to obtain a positive electrode in which positive electrode mixture layers were formed on both the surfaces of the positive electrode core.

[Production of Negative Electrode]

Graphite, Si oxide, carboxymethylcellulose (CMC), and styrene-butadiene rubber (SBR) were mixed in water at a solid content mass ratio of 95:5:1:1.2 by using a mixer to prepare a negative electrode mixture slurry. This negative electrode mixture slurry was applied on both surfaces of copper foil, and the coating was dried and then compressed by using a roller. The negative electrode core was cut in a strip shape with a predetermined width to obtain a negative electrode in which negative electrode mixture layers were formed on both the surfaces of the negative electrode core.

[Production of Separator]

A porous substrate with 12 μm in thickness made of polyethylene was prepared. An $\alpha$-$Al_2O_3$ powder and an acrylate-ester-type binder emulsion were mixed at a solid content mass ratio of 97:3, and then an appropriate amount of water was added so that the solid content concentration was 10 mass % to prepare a dispersion liquid. This dispersion liquid is applied on an entire region of one surface of the substrate by using a micro-gravure coater, and the coating was heated and dried in an oven at 50° C. for 4 hours to form a first heat-resistant layer as a sheet having an average thickness of 41.1M on the one surface of the substrate. Subsequently, the same dispersion liquid was applied on the other surface of the substrate with a micro-gravure coater, and the coating was heated and dried in an oven at 50° C. for 4 hours to form a second heat-resistant layer as dots on the other surface of the substrate. By setting cells of the gravure plate (recesses for forming the dots) to have a diameter of 30 μm, a depth of 9 μm, and a pitch of 70 μm, the second heat-resistant layer in which a plurality of the dots having an average diameter of 50 μm and an average thickness of 3 μm were regularly disposed with a pitch of 50 μm was formed.

[Preparation of Non-Aqueous Electrolyte]

Into 100 parts by mass of a mixed solvent in which ethylene carbonate (EC) and dimethyl carbonate (DMC) were mixed at a volume ratio of 1:3, 5 parts by mass of vinylene carbonate (VC) were added, and $LiPF_6$ was dissolved at a concentration of 1 mol/L to prepare a non-aqueous electrolyte.

[Production of Non Aqueous Electrolyte Secondary Battery]

A positive electrode lead was attached to the positive electrode core, a negative electrode lead was attached to the negative electrode core, and the positive electrode and the negative electrode were spirally wound with the separator interposed therebetween to produce a wound electrode assembly. In this time, the separator was disposed so that the first heat-resistant layer faced the positive electrode side and the second heat-resistant layer faced the negative electrode side. Insulating plates were disposed on upper and lower sides of the electrode assembly, respectively, the negative electrode lead was welded to an inner bottom face of a bottomed cylindrical exterior housing can, and the positive electrode lead was welded to a sealing assembly to house the electrode assembly into the exterior housing can. The non-aqueous electrolyte was injected into the exterior housing can, and then an opening of the exterior housing can was sealed with the sealing assembly with a gasket interposed therebetween to obtain a non-aqueous electrolyte secondary battery.

separator, the depth of the cell of the gravure plate was changed to 14 μm to set the average thickness of the dots to be 5 μm.

Example 3

A separator and a battery were produced to evaluate cycle characteristics in the same manner as in Example 1 except that, in the formation of the second heat-resistant layer of the separator, the depth of the cell of the gravure plate was changed to 28 μm to set the average thickness of the dots to be 10 μm.

Comparative Example 1

A separator and a battery were produced to evaluate cycle characteristics in the same manner as in Example 1 except that, in the production of the separator, the second heat-resistant layer was not formed. In the production of the electrode assembly, the separator was disposed so that the first heat-resistant layer faced the positive electrode side and the other surface of the porous substrate having no heat-resistant layer faced the negative electrode side.

Comparative Example 2

A separator and a battery were produced to evaluate cycle characteristics in the same manner as in Example 1 except that, in the production of the separator, the dispersion liquid was applied on the entire region of the other surface of the porous substrate to form a second heat-resistant layer as a sheet having an average thickness of 4 μm.

TABLE 1

| | Forming pattern | | | | | |
|---|---|---|---|---|---|---|
| | First heat-resistant layer | Second heat-resistant layer | Dot diameter/μm | Dot pitch/μm | Dot thickness/μm | Capacity maintenance rate/% |
| Comparative Example 1 | Sheet | — | — | — | — | 60 |
| Example 1 | Sheet | Dots | 50 | 50 | 3 | 75 |
| Example 2 | Sheet | Dots | 50 | 50 | 5 | 80 |
| Example 3 | Sheet | Dots | 50 | 50 | 10 | 70 |
| Comparative Example 2 | Sheet | Sheet | — | — | — | 59 |

[Evaluation of Charge-Discharge Cycle Characteristics]

The produced non-aqueous electrolyte secondary battery was charged at a constant current of 0.3 It until a battery voltage reached 4.2 V, and then charged at a constant voltage of 4.2 V until a current reached 0.05 It. Thereafter, the battery was discharged at a constant current of 0.5 It until the battery voltage reached 2.5 V. This charge-discharge cycle was performed with 700 cycles to determine a capacity maintenance rate with the following formula. Table 1 shows the evaluation results (the same applies to Examples 2 and 3 and Comparative Examples 1 and 2, described later).

Capacity Maintenance Rate (%)=(Discharge Capacity at 700th Cycle/Discharge Capacity at 1st Cycle)×100

Example 2

A separator and a battery were produced to evaluate cycle characteristics in the same manner as in Example 1 except that, in the formation of the second heat-resistant layer of the As found from the results in Table 1, any of the batteries of Examples have a higher capacity maintenance rate after the 700 cycles and excellent charge-discharge cycle characteristics compared with the batteries of Comparative Examples 1 and 2. This is presumably because the second heat-resistant layer formed as dots generates the space to store the electrolyte liquid between the negative electrode mixture layer and the separator to allow the electrolyte liquid to be sufficiently present on the negative electrode surface even in the terminal stage of the cycles. In particular, the effect of improving the cycle characteristics was more remarkable when the average thickness of the dots was set to be greater than or equal to 3 μm and less than or equal to 5 μm (Examples 1 and 2).

Example 4

A separator and a battery were produced to evaluate cycle characteristics in the same manner as in Example 2 except that, in the formation of the second heat-resistant layer of the separator, the pitch of the cells of the gravure plate was changed to 50 μm to set the average pitch of the dots to be 30 μm. Table 2 shows the evaluation results (the same applies to Example 5 and Comparative Examples 3 to 5, described later).

Example 5

A separator and a battery were produced to evaluate cycle characteristics in the same manner as in Example 2 except that, in the formation of the second heat-resistant layer of the separator, the pitch of the cells of the gravure plate was changed to 120 μm to set the average pitch of the dots to be 100 μm.

Comparative Example 3

A separator and a battery were produced to evaluate cycle characteristics in the same manner as in Example 2 except that, in the formation of the second heat-resistant layer of the separator, the pitch of the cells of the gravure plate was changed to 30 μm to set the average pitch of the dots to be 10 μm.

Comparative Example 4

A separator and a battery were produced to evaluate cycle characteristics in the same manner as in Example 2 except that, in the formation of the second heat-resistant layer of the separator, the pitch of the cells of the gravure plate was changed to 220 μm to set the average pitch of the dots to be 200 μm.

Comparative Example 5

A separator and a battery were produced to evaluate cycle characteristics in the same manner as in Example 2 except that, in the formation of the second heat-resistant layer of the separator, the pitch of the cells of the gravure plate was changed to 1020 μm to set the average pitch of the dots to be 1000 μm.

TABLE 2

| | Forming pattern | | | | | Capacity |
|---|---|---|---|---|---|---|
| | First heat-resistant layer | Second heat-resistant layer | Dot diameter/μm | Dot pitch/μm | Dot thickness/μm | maintenance rate/% |
| Comparative Example 3 | Sheet | Dots | 50 | 10 | 5 | 60 |
| Example 4 | Sheet | Dots | 50 | 30 | 5 | 78 |
| Example 2 | Sheet | Dots | 50 | 50 | 5 | 80 |
| Example 5 | Sheet | Dots | 50 | 100 | 5 | 72 |
| Comparative Example 4 | Sheet | Dots | 50 | 200 | 5 | 61 |
| Comparative Example 5 | Sheet | Dots | 50 | 1000 | 5 | 61 |

As found from Table 2, any of the batteries of Examples have a high capacity maintenance rate after the 700 cycles and excellent charge-discharge cycle characteristics. It is presumed that this is the effect of the space generated between the negative electrode mixture layer and the separator. Meanwhile, in the batteries of Comparative Examples 3 to 5, considerable decrease in the capacity maintenance rate was observed after the 700 cycles. When the dot pitch was 10 μm (Comparative Example 3), it was presumed that the space generated between the negative electrode mixture layer and the separator was insufficient, and a sufficient amount of the electrolyte liquid was not retained on the negative electrode surface to considerably decrease the capacity maintenance rate. When the dot pitch was greater than or equal to 200 μm (Comparative Examples 4 and 5), it was presumed that the space between the negative electrode mixture layer and the separator was pressed by a pressure inside the battery to decrease, and a sufficient amount of the electrolyte liquid was not retained on the negative electrode surface to considerably decrease the capacity maintenance rate. In particular, the effect of improving the cycle characteristics was more remarkable when the pitch of the dots was set to be greater than or equal to 30 μm and less than or equal to 50 μm (Examples 2 and 4).

Comparative Example 6

A battery was produced to evaluate cycle characteristics in the same manner as in Example 2 except that, in the formation of the electrode assembly, the separator was disposed so that the first heat-resistant layer faced the negative electrode side and the second heat-resistant layer faced the positive electrode side. Table 3 shows the evaluation results.

TABLE 3

| | Forming pattern | | | | | |
|---|---|---|---|---|---|---|
| | First heat-resistant layer | Second heat-resistant layer | Dot diameter/μm | Dot pitch/μm | Dot thickness/μm | Capacity maintenance rate/% |
| Comparative Example 1 | Sheet | — | — | — | — | 60 |
| Example 2 | Sheet | Dots | 50 | 50 | 5 | 80 |
| Comparative Example 6 | Dots | Sheet | 50 | 50 | 5 | 55 |

As found from Table 3, when the heat-resistant layer formed as dots was present on the surface of the substrate facing the positive electrode (Comparative Example 6), a larger decrease in the capacity than that of Comparative Example 1 was observed after the 700 cycles. This was presumably because a space to store the electrolyte liquid was generated between the positive electrode mixture layer and the separator, resulting in enhancement of the uneven distribution of the electrolyte liquid on the positive electrode side and the shortage of the electrolyte liquid on the negative electrode side.

As above, the non-aqueous electrolyte secondary battery having excellent cycle characteristics may be provided only when the first heat-resistant layer is formed as a sheet on the first surface of the porous substrate of the separator facing the positive electrode and the second heat-resistant layer is formed as dots disposed with a predetermined pitch on the second surface facing the negative electrode.

REFERENCE SIGNS LIST

10 Non-aqueous electrolyte secondary battery, 11 Positive electrode, 12 Negative electrode, 13 Separator, 14 Electrode assembly, 16 Exterior housing can, 17 Sealing assembly, 18, 19 Insulating plate, 20 Positive electrode lead, 21 Negative electrode lead, 22 Grooved portion, 23 Internal terminal plate, 24 Lower vent member, 25 Insulating member, 26 Upper vent member, 27 Cap, 28 Gasket, 30 Substrate, 31 First heat-resistant layer, 32 Second heat-resistant layer, 33 Dot, 34 Space

The invention claimed is:

1. A non-aqueous electrolyte secondary battery, comprising:
- a positive electrode;
- a negative electrode; and
- a separator, wherein
  - the separator has:
    - a porous substrate; and
    - heat-resistant layers each including a filler and a binder, the heat-resistant layers include:
    - a first heat-resistant layer formed on a first surface of the porous substrate facing the positive electrode; and
    - a second heat-resistant layer formed on a second surface of the porous substrate facing the negative electrode,
  - the first heat-resistant layer is formed as a sheet on the first surface of the porous substrate,
  - the second heat-resistant layer is formed as dots on the second surface of the porous substrate,
  - an average value of pitch of a plurality of the dots is greater than or equal to 30 μm and less than or equal to 100 μm, and
  - an average value of thicknesses of the plurality of the dots constituting the second heat-resistant layer is greater than or equal to 3 μm and less than or equal to 10 μm.

2. The non-aqueous electrolyte secondary battery according to claim 1, wherein an average value of diameters of circumscribed circles of the plurality of the dots constituting the second heat-resistant layer is greater than or equal to 30 μm and less than or equal to 100 μm.

3. The non-aqueous electrolyte secondary battery according to claim 1, wherein the plurality of the dots constituting the second heat-resistant layer are cylindrically formed.

4. The non-aqueous electrolyte secondary battery according to claim 1, wherein the porous substrate is composed of a polyolefin as a main component.

* * * * *